UNITED STATES PATENT OFFICE.

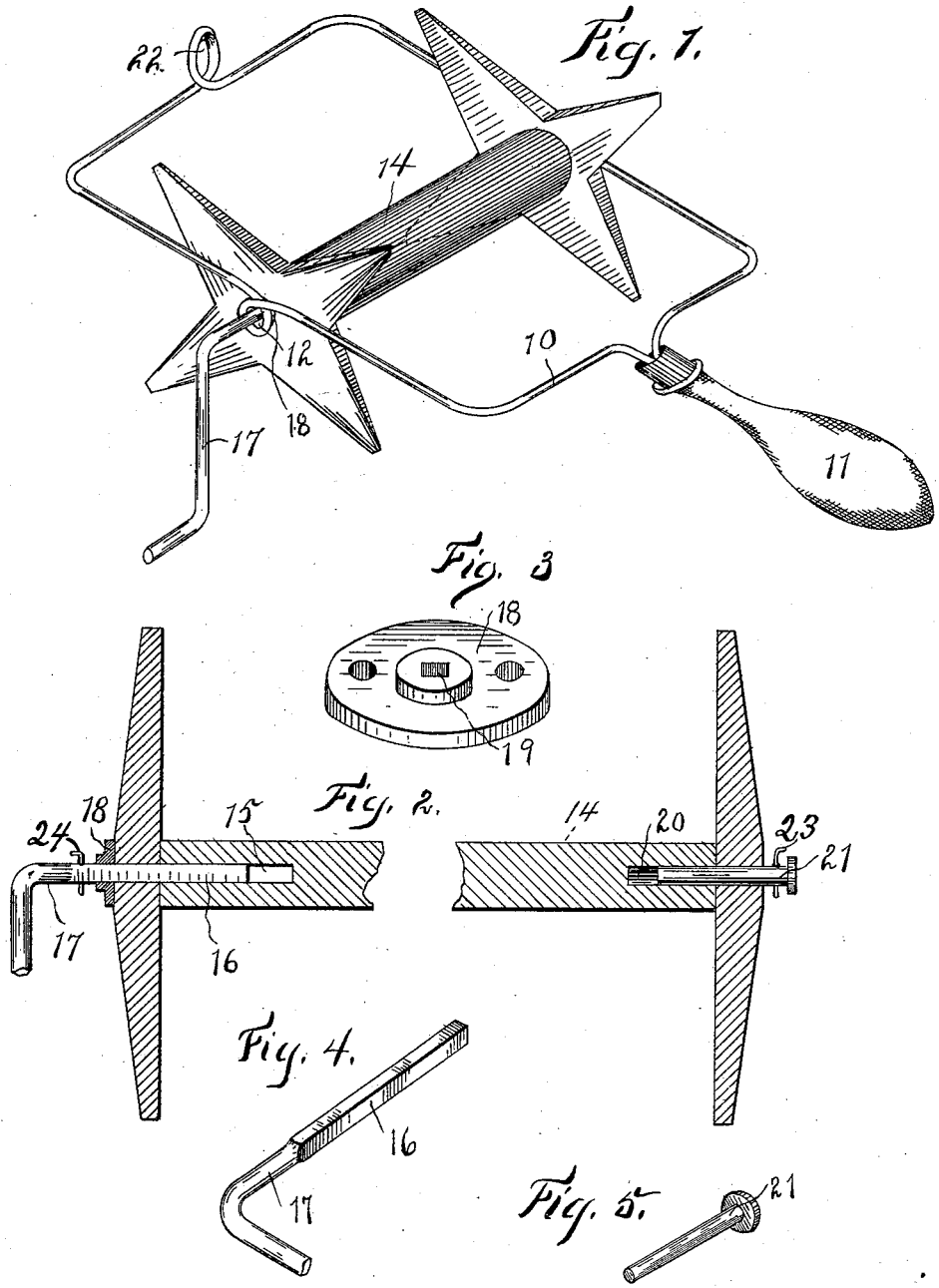

EMIL NOLL, OF ST. LOUIS, MISSOURI.

PORTABLE CLOTHES-LINE HOLDER.

SPECIFICATION forming part of Letters Patent No. 591,290, dated October 5, 1897.

Application filed April 4, 1894. Renewed April 7, 1897. Serial No. 631,165. (No model.)

*To all whom it may concern:*

Be it known that I, EMIL NOLL, of the city of St. Louis, State of Missouri, have invented certain new and useful Improvements in a Portable Clothes-Line Holder, of which the following is a full, clear, and exact description, reference being had to the accompanying drawings, forming a part hereof.

The object of this invention is to provide improved means, adapted to be carried by the hand and manually operated, whereby a clothes-line or other cord, wire, or analogous object may be conveniently bundled, as required, for transportation and packing when not in use.

My invention consists in the novel features of construction, combination, and arrangement of parts hereinafter described and claimed.

Referring to the drawings, Figure 1 is a perspective view of the complete device. Fig. 2 is a transverse sectional view through the center of the drum. Fig. 3 is a detail perspective view of a cast bearing. Fig. 4 is a detail perspective view of the winch. Fig. 5 is a detail perspective view of the pivotal pin.

In the construction of the device as shown the numeral 10 designates a frame made of a single length of wire and having its end portions approximated and inserted within a handle 11. The frame 10 is approximately rectangular in plan view and has opposite loops 12 formed in the central portions of the long sides thereof, both sides being of the same construction.

Mounted within the frame 10 is a drum or reel 14, which said drum is provided at one end with a central angular bore 15, in which is loosely inserted the angular portion 16 of a winch or crank-shaft 17, a separate bearing 18, preferably of cast metal, being mounted upon the end portion of the drum 14, adjacent to and surrounding the bore 15, which said bearing is provided with an angular aperture 19, engaged by said angular portion of the winch.

The end portion of the drum 14, opposite to the winch 17, is provided with a cylindrical bore 20, in which is mounted a pin or shaft 21, having a head on the outer end portion, which said pin or shaft passes through a loop 12, adjacent thereto.

A spring-cotter or small pin 23 is inserted transversely in the pin 21 outside of the end of the drum 14 and inside of the loop 12 and is designed to prevent the pin 21 from dropping out of the bore 20 during the operation of the reel. A similar spring-cotter or pin 24 is inserted transversely through the crank-shaft 17 outside of the bearing 18 and inside of the loop 12 and is designed to prevent the crank-shaft from being removed or dropping out of the bore 15 during the operation of the reel.

Formed in the central portion of the forward end of the frame 10 is a loop 22, adapted to have the line pass therethrough and guide the same to a position upon or from the drum 14.

In the practical use of this invention the device is sustained by the operator grasping the handle 11, and the line is reeled upon the drum 14 by the manual rotation of said drum through the medium of the crank 17, it being apparent that the unreeling of the line from said drum necessitates no operation other than the application of a pulling force to the device, the otherwise free end portion of the line being secured to a stationary object.

When it is desired to pack the drums loaded with line, the pin 21 and winch 17 are removed from the bores of said drums, the drums being then removed from the frames 10 and positioned as desired, the pins, winches, and frames being free from the said drums.

What I claim is—

In a clothes-line reel, a drum 14 having the central angular bore 15 in one of its ends and the central cylindrical bore 20 in its other end, the frame 10 having the bearings 12 in transverse alinement and the loop 22 at the front end of said frame, the crank-shaft 17 operating in one of the bearings 12 and in said angular bore 15, the pin 24 penetrating said crank-shaft and designed to hold said shaft in position, the pin 21 operating in said cylindrical bore and the pin 23 penetrating said pin 21 and designed to hold said pin 21 in position, substantially as specified.

In testimony whereof I affix my signature in presence of two witnesses.

EMIL NOLL.

Witnesses:
 M. G. IRION,
 JNO. C. HIGDON.